(12) United States Patent
Ehrlich et al.

(10) Patent No.: US 7,095,580 B2
(45) Date of Patent: Aug. 22, 2006

(54) METHODS TO DETERMINE GROSS AND FINE POSITIONING ON A REFERENCE SURFACE OF A MEDIA

(75) Inventors: Richard M. Ehrlich, Saratoga, CA (US); Gary W. Calfee, Santa Clara, CA (US); Anton Gerasimov, San Francisco, CA (US); James V. Wiseman, Palo Alto, CA (US)

(73) Assignee: Matsushita Electric Industrial Co., Ltd, Osaka (JP)

( * ) Notice: Subject to any disclaimer, the term of this patent is extended or adjusted under 35 U.S.C. 154(b) by 11 days.

(21) Appl. No.: 10/733,131

(22) Filed: Dec. 10, 2003

(65) Prior Publication Data
US 2005/0128629 A1    Jun. 16, 2005

(51) Int. Cl.
G11B 5/596    (2006.01)
(52) U.S. Cl. .................... 360/77.08; 360/48
(58) Field of Classification Search ............ None
See application file for complete search history.

(56) References Cited

U.S. PATENT DOCUMENTS

| | | | | |
|---|---|---|---|---|
| 4,354,208 A | 10/1982 | Maury | ............... | 360/40 |
| 5,862,005 A | 1/1999 | Leis | ............... | 360/27 |
| 5,956,196 A * | 9/1999 | Hull et al. | ............... | 360/65 |
| 6,069,764 A | 5/2000 | Morris | ............... | 360/77.04 |
| 6,304,407 B1 | 10/2001 | Baker | ............... | 360/75 |
| 6,738,205 B1 | 5/2004 | Moran et al. | | |
| 2001/0043428 A1 | 11/2001 | Morris et al. | | |

OTHER PUBLICATIONS

Saito et al., "Optimization of a Magnetic Printing Process by Computer Simulation," in *IEEE Transactions on Magnetics*, vol. 37, No. 4, Jul. 2001, pp. 1389-1392.
Ishida et al., "Demodulation of Servo Tracking Signals Printed with a Lithographically Patterned Master Disk," in *IEEE Transactions on Magnetics*, vol. 37, No. 4, Jul. 2001, pp. 1412-1415.
Ishida et al., "Printed Media Technology for an Effective and Inexpensive Servo Track Writing of HDDs," in *IEEE Transactions on Magnetics*, vol. 37, No. 4, Jul. 2001, pp. 1875-1877.

* cited by examiner

*Primary Examiner*—David Hudspeth
*Assistant Examiner*—Mitchell Slavitt
(74) *Attorney, Agent, or Firm*—Fliesler Meyer LLP

(57) ABSTRACT

Methods in accordance with the present invention can include determining a position of a head along a stroke by locating one or more marker-zones printed to a reference surface of a disk. The one or more marker-zones can be printed to a portion of the reference surface as one or more pulses from a template pattern that can further comprise a plurality of chevrons. In one embodiment, each pulse can trace the motion of the stroke along at least a portion of the radius of the reference surface. A pulse can identify a marker-zone edge when the pulse disappears at some radius from the center of the disk. By moving the head along the stroke, the marker-zone edge can be detected and a gross position determined. A fractional position can be determined by measuring a phase of a chevron located at substantially the same radial location as the edge.

21 Claims, 5 Drawing Sheets

METHODS TO DETERMINE GROSS AND FINE POSITIONING ON A REFERENCE SURFACE OF A MEDIA

TECHNICAL FIELD

The present invention relates to rotatable media data storage devices, as for example optical or magnetic hard disk drive technology, and servo technology for rotatable media data storage devices.

BACKGROUND

A hard disk drive typically contains one or more disks clamped to a rotating spindle, at least one head for reading data from and/or writing data to the surfaces of each disk, and an actuator utilizing linear or rotary motion for positioning the head(s) over selected data tracks on the disk(s). A rotary actuator is a complex assembly that couples a slider on which a head is attached or integrally formed to a pivot point that allows the head to sweep across a surface of a rotating disk. A servo system uses positioning data read by the head from the disk to determine the position of the head on the disk. In common servo schemes, positioning data can be included in servo wedges, each comprising servo patterns. Servo wedges can be written to each disk using a media writer, prior to assembly of the hard disk drive. Alternatively, a reference surface of one disk can be used to write servo wedges on blanks disks substituted for media-written disks in an assembled hard disk drive.

The reference surface can include a template pattern containing information for writing servo patterns on the surfaces of the disks. The template pattern typically includes timing bursts, or pulses, defining information. Chevrons can be incorporated into template patterns to indicate radial positioning of the head. The maximum frequency of the template pattern can be constrained by a combination of factors, including the minimum available feature-size of the pattern elements, the angle of the chevrons and an orientation of the head at the inner diameter of the disk. A low frequency template pattern may introduce more written-in runout when writing servo patterns than a template pattern having a higher frequency. The performance of a hard disk drive may be adversely affected by an increased amount of written-in runout contained in a servo pattern.

BRIEF DESCRIPTION OF THE FIGURES

Further details of embodiments of the present invention are explained with the help of the attached drawings in which.

DETAILED DESCRIPTION

Figure 1:
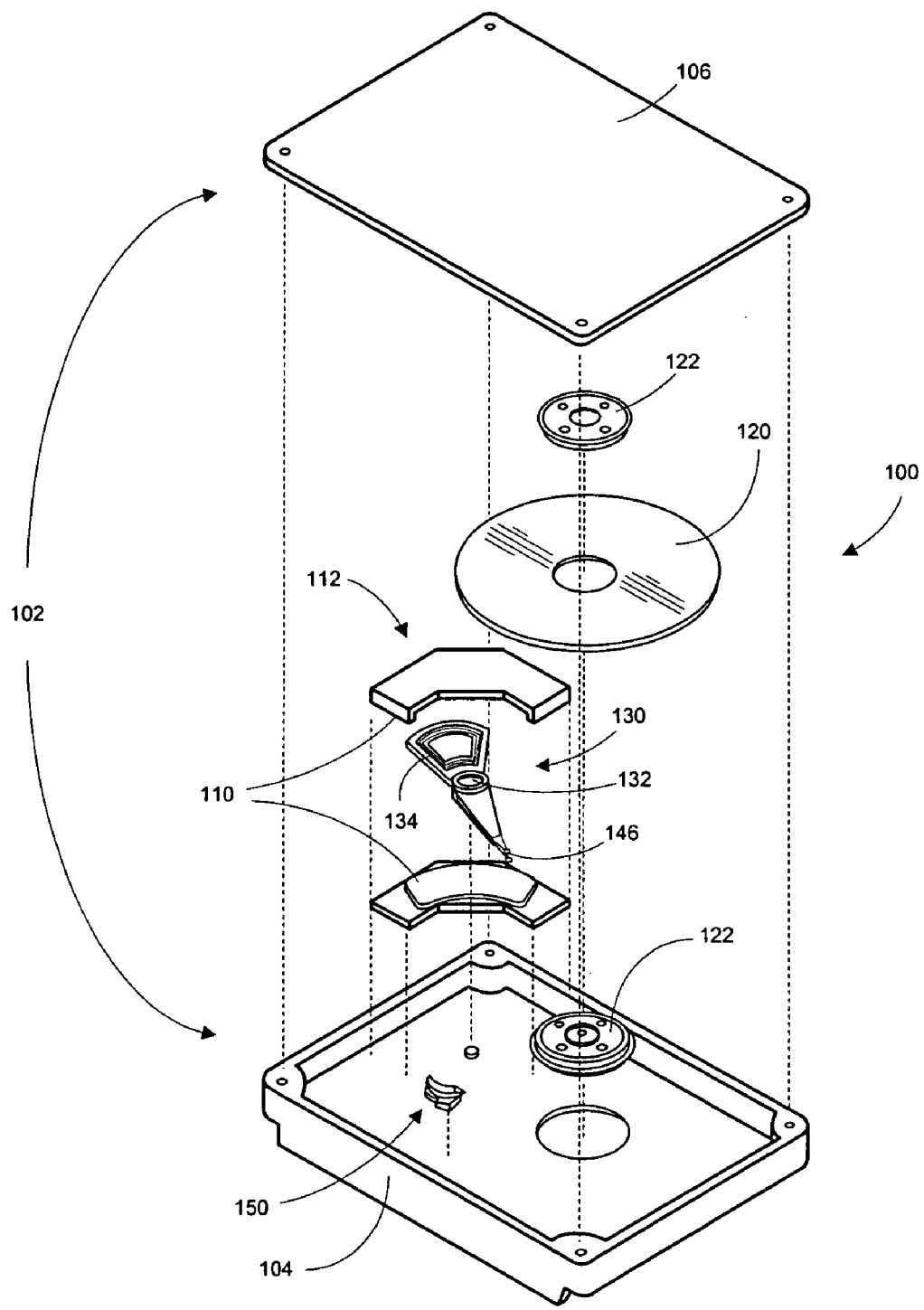
FIG. 1 is an exploded view of an exemplary hard disk drive for applying embodiments of the present invention.

FIG. 1 is an exploded view of an exemplary hard disk drive 100 for applying a method in accordance with one embodiment of the present invention. The hard disk drive 100 includes a housing 102 comprising a housing base 104 and a housing cover 106. The housing base 104 illustrated is a base casting, but in other embodiments a housing base 104 can comprise separate components assembled prior to, or during assembly of the hard disk drive 100. A disk 120 is attached to a rotatable spindle motor 122, for example by clamping, and the spindle motor 122 is connected with the housing base 104. The disk 120 can be made of a light aluminum alloy, ceramic/glass or other suitable substrate, with magnetizable material deposited on one or both sides of the disk. The magnetic layer has tiny domains of magnetization for storing data transferred through heads 146. In one embodiment, each head 146 is a magnetic transducer adapted to read data from and write data to the disk 120. The disk can be rotated at a constant or varying rate typically ranging from less than 3,600 to more than 15,000 RPM (speeds of 4,200 and 5,400 RPM are common in hard disk drives designed for mobile devices such as laptop computers). The invention described herein is equally applicable to technologies using other media, as for example, optical media. Further, the invention described herein is equally applicable to devices having any number of disks attached to the hub of the spindle motor. In other embodiments, the head 146 includes a separate read element and write element. For example, the separate read element can be a magneto-resistive head, also known as a MR head. It will be understood that multiple head 146 configurations can be used.

A rotary actuator 130 is pivotally mounted to the housing base 104 by a bearing 132 and sweeps an arc between an inner diameter (ID) of the disk and a ramp 130 positioned near an outer diameter (OD) of the disk 108. Attached to the housing 104 are upper and lower magnet return plates 110 and at least one magnet that together form the stationary portion of a voice coil motor (VCM) 112. A voice coil 134 is mounted to the rotary actuator 130 and positioned in an air gap of the VCM 112. The rotary actuator 130 pivots about the bearing 132 when current is passed through the voice coil 134 and pivots in an opposite direction when the current is reversed, allowing for precise positioning of the head 146 along the radius of the disk 120. The VCM 112 is coupled with a servo system (not shown) that uses positioning data read by the head 146 from the disk 120 to determine the position of the head 146 over tracks on the disk 120. The servo system determines an appropriate current to drive through the voice coil 134, and drives the current through the voice coil 134 using a current driver and associated circuitry (not shown).

Each side of a disk 120 can have an associated head 146, and the heads 146 are collectively coupled to the rotary actuator 130 such that the heads 146 pivot in unison. The invention described herein is equally applicable to devices wherein the individual heads separately move some small distance relative to the actuator. This technology is referred to as dual-stage actuation (DSA).

One type of servo system is a sectored, or embedded, servo system in which tracks on all disk surfaces contain small segments of servo data often referred to as servo wedges or servo sectors. Each track can contain an equal number of servo wedges, spaced relatively evenly around the circumference of the track. Hard disk drive designs have been proposed having different numbers of servo wedges on different tracks, and such hard disk drive designs could also benefit from the invention contained herein.

Figure 2:
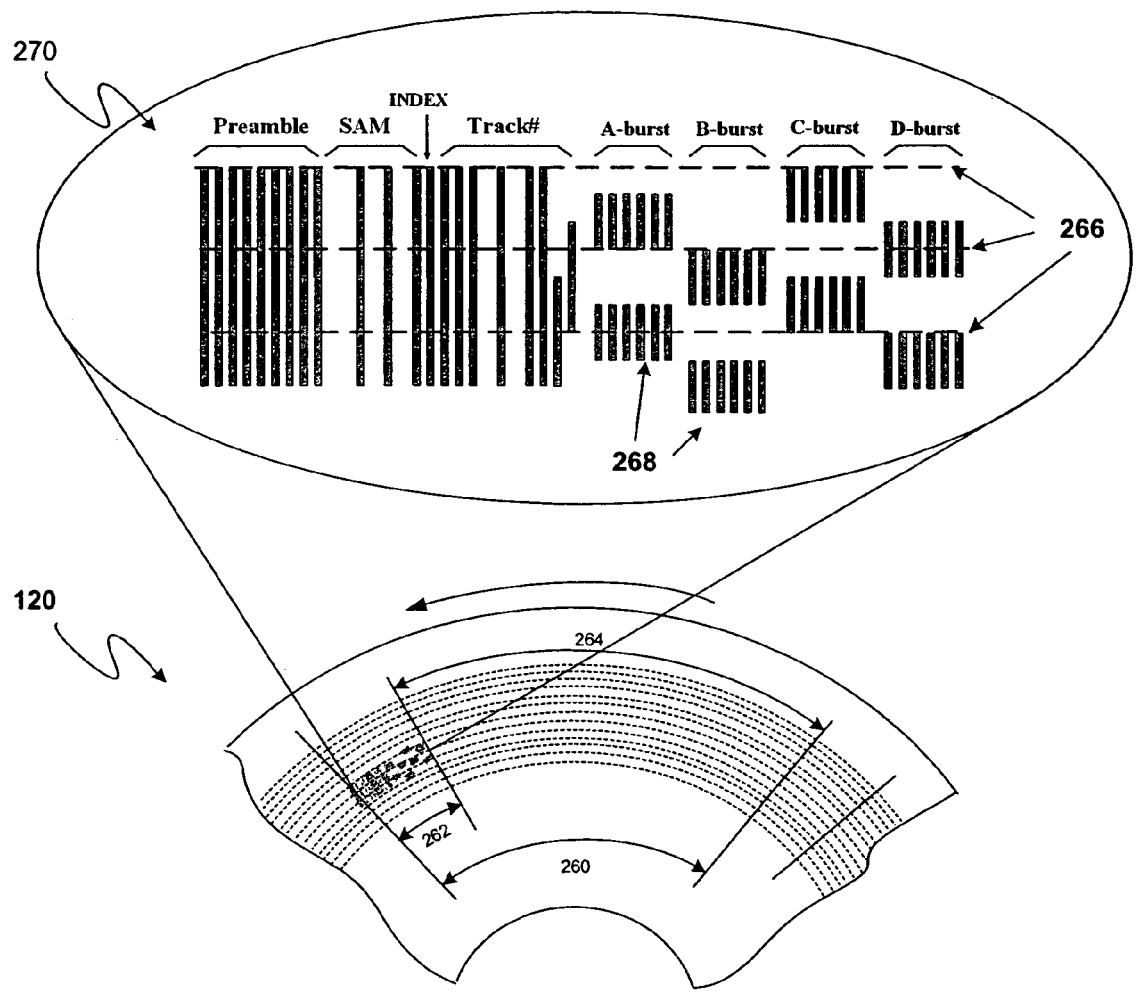
FIG. 2 is a partial detailed view of a disk from the hard disk drive shown in FIG. 1 having a final servo pattern.

FIG. 2 shows a portion of a disk 120 having at least one servo wedge 262. Each servo wedge 262 includes information stored as regions of magnetization or other indicia, such as optical indicia. A servo wedge 262 can be longitudinally magnetized (for example, in the magnified portion of FIG. 2 a servo pattern 270 includes grey blocks magnetized to the left and white spaces magnetized to the right, or vice-versa) or alternatively perpendicularly magnetized (i.e. the grey blocks are magnetized up and the white spaces are magnetized down, or vice-versa). Servo patterns 270 contained in each servo wedge 262 are read by the head 146 as the surface of the spinning disk 120 passes under the head 146. The servo patterns 270 can include information identifying a data sector contained in a data field 264. For example, the servo pattern 270 can include a servo address mark (SAM), track identification, etc. Further, information included in the servo patterns 270 can be used to generate a position error signal (PES) to correct off-track deviations. The magnified portion of FIG. 2 illustrates one track following scheme in which track following signals are recorded in bursts 268 arranged in four columns (labeled A-burst through D-burst) allowing for a quadrature PES. The radial density of servo bursts 268 as shown is greater than the radial density of data tracks by a factor of 1.5, however in other embodiments, the ratio of the radial densities of bursts 268 and data tracks can be greater or less than 1.5. For example, the radial density of bursts 268 can be the same as the radial density of data tracks.

In the data track following scheme shown, centerlines 266 of data tracks are alternately defined by boundaries between bursts from columns A and B, and boundaries between bursts from columns C and D. If the head 146 remains centered over a target data track centerline 266, a PES of zero is calculated and no change in position is required. As the path of the head 146 deviates from the target data track centerline 266, a difference in the relative amplitudes of successive burst signals 268 is detected by a disk controller (not shown), a PES is calculated, and an appropriate actuation current is applied to the voice coil 134, causing the rotary actuator 130 to reposition the head 146. The scheme described above is only one of many possible schemes for positioning the head. Hard disk drives using most (if not all) possible PES schemes could benefit from the invention contained herein.

Servo patterns 270 can be written to the disks 120 using a media writer, prior to assembly of the hard disk drive 100. Stacks of disks 120 can be loaded onto the media writer and servo patterns 270 can be carefully written onto the surface of each disk 120, a time consuming and costly process. Alternatively, a commonly less time-consuming and less expensive method can include writing servo patterns or template patterns on a reference surface of a single blank disk to be used as a reference for self-servo writing unwritten (and written) surfaces of one or more disks 120 of an assembled hard disk drive 100.

In one such self-servo writing method, called printed-media self-servo writing (PM-SSW), a coarse magnetic template pattern can be transferred to a single disk surface (a reference surface) by magnetic printing. A magnetic printing station can be used to magnetically print or otherwise transfer a template pattern using a known transfer technique. One such transfer technique is described in "Printed Media Technology for an Effective and Inexpensive Servo Track Writing of HDDs" by Ishida, et al. *IEEE Transactions on Magnetics*, Vol. 37, No. 4, July 2001. A blank disk (the reference surface) is DC erased along the circumferential direction of the disk by rotating a permanent magnet block on the disk surface. A template, or "master", disk is then aligned with the blank disk and the two disks are securely faced with each other by evacuating the air between the two disk surfaces through a center hole in the blank disk. An external DC field is applied again in the same manner as in the DC erasing process, but with an opposite polarity.

In an alternative transfer technique a unidirectional magnetic domain orientation is applied to the blank disk. A reticle or magnetic die having a template pattern is aligned with, and placed in close proximity with the blank disk, and the blank disk is heated to approach the Curie temperature of the magnetic layer on the reference surface of the blank disk. The reference surface of the blank disk is then selectively magnetized in accordance with the template pattern of the reticle or die by a reverse bias field. Where an optical reticle is used, intense local heating through reticle apertures may be obtained from a laser beam, for example. A number of different transfer techniques exist, and the examples provided are not intended to be exhaustive. One of ordinary skill in the art can appreciate the different methods for transferring a template pattern to a reference surface.

Figure 3:
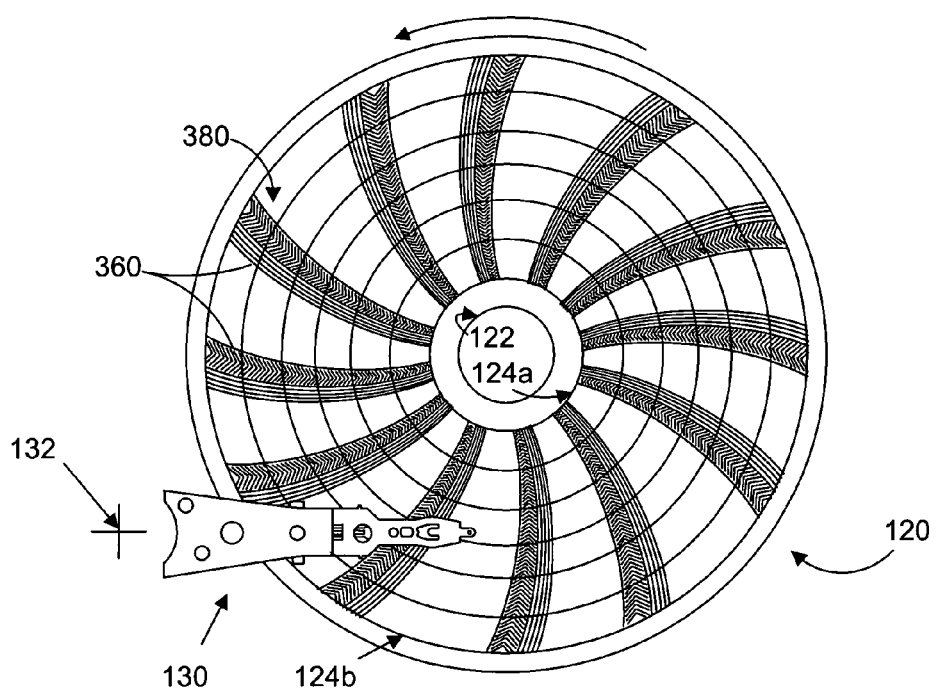
FIG. 3 is an illustration of a rotary actuator of the hard disk drive of FIG. 1 positioned over a reference surface of a disk having a template pattern.

FIG. 3 illustrates a reference surface having a magnetically printed template pattern 380 usable for PM-SSW. The template pattern 380 can be divided into a number of pattern wedges 360 equivalent to the number of servo wedges 262 intended for the final servo pattern 270, and printed such that the pattern wedges 360 trace an arc approximately matching the arcing sweep of the head 146 from the ID 324*a* to the OD 324*b* as described above. In other embodiments, the template pattern 380 can have fewer or more pattern wedges 360 than intended servo wedges 262. Further, the pattern wedges 360 need not be printed having arc.

The template pattern 380 can comprise clocking and, optionally, radial position information. A completed and enclosed hard disk drive 100 can be assembled comprising at least one disk 120 having a reference surface, and optionally one or more blank disks. The template pattern 380 can be used by the hard disk drive electronics to self-write highly resolved product embedded servo patterns 270 onto storage surfaces of each disk 120, including the reference surface having the template pattern 380.

When a disk 120 having a reference surface is removed from a magnetic printing station and connected with a spindle 122, a shift typically occurs between the axis of rotation and the center of tracks of the template pattern 380. The shift is attributable to machining tolerances of the spindle and magnetic printing station, as well as other variables. The track followed by the head 146 can be displaced laterally in a sinusoidal fashion relative to the head 146 as the disk 120 rotates. This sinusoidal displacement is typically referred to as eccentricity. Firmware executed by the hard disk drive 100 and the hard disk drive electronics enable the head 146 positioned over the reference surface to follow and read the template pattern 380 and enable each of the heads 146 to write precise final servo patterns 270 on each of the respective surfaces of each disk 120. The hard disk drive 100 can compensate for eccentricity, writing tracks that are nominally concentric with the center of rotation of the spindle, or alternatively, having some built-in eccentricity as defined by the firmware, for example. A final servo pattern 270 can be written to the reference surface in any sequence, i.e. prior to, subsequent to, or contemporaneously with writing final servo patterns on some or all of the other surfaces. The final servo patterns can be written contemporaneously to reduce servo write times, and the final servo patterns 270 can be written between pattern wedges 360 of the template pattern 380. The template pattern 380 is overwritten either during the self-servo writing process or by user data. For example during hard disk drive 100 testing data is written to the data fields 264 and read back to test the data fields 264.

Printing techniques can produce template patterns of relatively low frequency. A low frequency template pattern 380 can cause relatively high PES noise and a high SAM error-rate. High PES noise can introduce an unacceptable level of written-in runout when writing servo wedges 262. The low frequency template pattern 380 can result in part because of feature-size limitations of the lithographic process used to make a reticle or magnetic die, which currently limits features to a minimum lateral dimension of approximately 0.5 µm. However, the maximum frequency of the template pattern 380 is constrained by a combination of factors, and can be expressed by the equation $$f_{max} = \frac{2\pi R_{ID} f_{spin}}{2\Delta} \cos(\theta_s + \theta_c)$$

where $\Delta$ is the minimum feature size, $f_{spin}$ is the spin speed of the disk, $R_{ID}$ is the ID radius of the printed pattern, $\theta_c$ is chevron angle of the template pattern (where chevron angles are incorporated into the template pattern), and $\theta_s$ is head skew at the ID. The orientation of the head 146 can have varying skew relative to a radial line from the center of the disk. Head skew results at least partially from the arc swept by the head 146 as it moves over the surface (as described above).

Figure 4A:
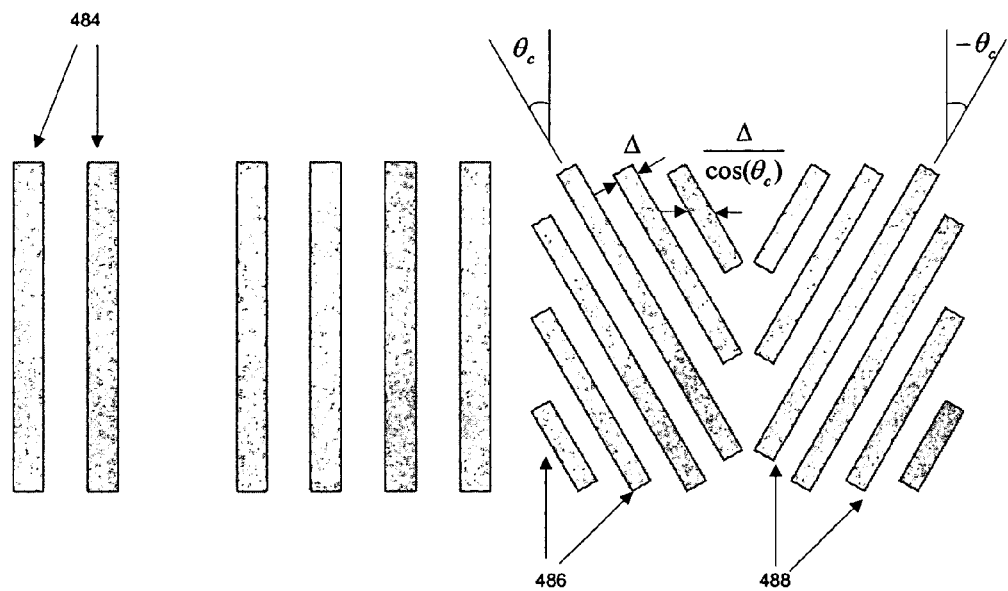
FIG. 4A illustrates a portion of a wedge from a template pattern not incorporating head skew.

FIG. 4A illustrates a template pattern 380 as shown in FIG. 3, including bursts ("pulses") 484, and chevrons ("zig-bursts" 486 and "zag-bursts" 488), wherein the head skew is idealized to be zero. The pulses 484 include timing information for writing servo patterns, for example the pulses 484 can describe a crude SAM or an index mark. Chevrons 486,488 can be incorporated into the template pattern 380 to help identify radial positioning. A portion of the chevron, the chevron cycle, is converted into radial positioning information as the chevron passes beneath the head 146. Each chevron cycle provides only positioning information along the width of the chevron cycle $w_c$, and cannot communicate absolute radial position. Where the head skew is zero, both chevrons 486,488 equally limit the maximum allowed frequency because each chevron 486,488 is tilted by an equal amount relative to a radial line from the center of the disk 120. However, most of the template pattern 380 is oriented or follows an arc to match the sweep of the head 146 across the surface.

Figure 4B:
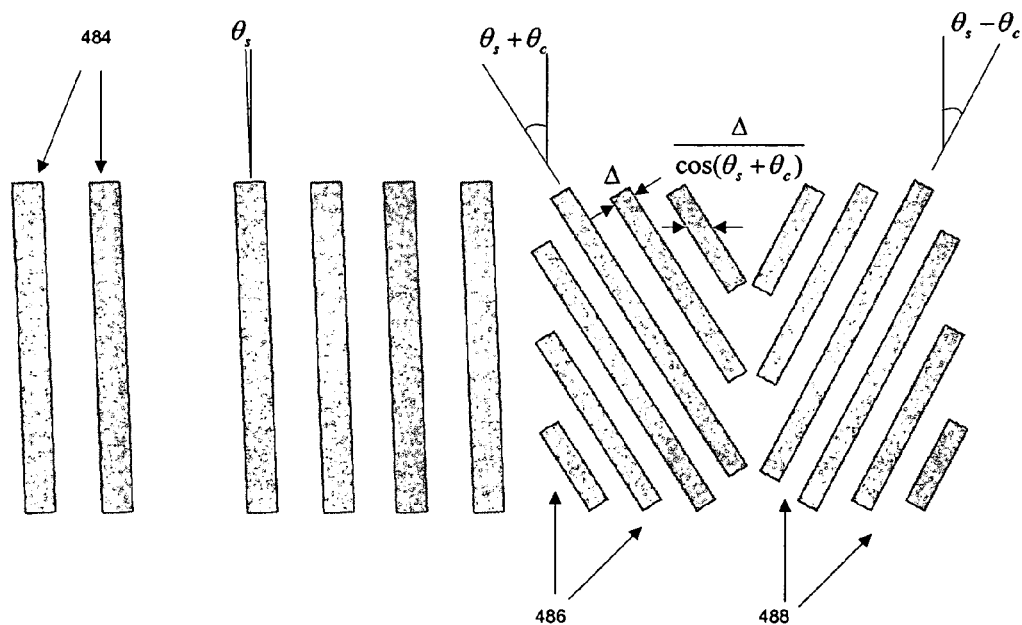
FIG. 4B illustrates a portion of a wedge from a template pattern incorporating non-zero head skew.

FIG. 4B illustrates a template pattern 380 wherein the pulses 484 and chevrons 486,488 are tilted an amount equal to an angle formed between the head 146 and a radial line from the center of the disk 120 (the head skew, $\theta_s$). By incorporating head skew into the template pattern 380, the head 146 can be positioned parallel to transitions between domains of magnetization of the pulses 484, thereby maximizing signal amplitude. In a template pattern 380 having zig-bursts 486 and zag-bursts 488 oriented as shown in FIG. 4B, at the ID (where the head skew is non-zero) the zig-burst 486 can have more tilt relative to the radial line than the zag-burst 488. The difference in tilt between the zig-burst 486 and the zag-burst 488 is equivalent to twice the chevron angle. The minimum allowable effective bit-length of the zig-bursts 486 (i.e. twice circumferential extent of the domain of magnetization read by the head 146 as the disk 120 passes beneath the head 146) is increased at the ID according to the following equation:

$$w_{zig} = \frac{\Delta}{\cos(\theta_s + \theta_c)}$$

while the minimum allowable effective bit-length of the zag-bursts 488 is decreased according to the equation:

$$w_{zag} = \frac{\Delta}{\cos(\theta_s - \theta_c)}$$

The differences between the minimum allowable bit-lengths of these three portions translate into different minimum allowable cycle-times for the portions. Because it is desired to maintain a single signal frequency for the pulses, the zig-bursts, and the zag-bursts, the large effective cycle-time of the zig-bursts 486 limits the pattern frequency.

In other embodiments of the template pattern 380, the zig-bursts 486 and zag-bursts 488 can be inverted such that the zig-bursts 486 incorporate a negative chevron angle relative to the radial line, and the zag-bursts 488 incorporate a positive chevron angle relative to the radial line (such that the bursts shown in FIG. 4A form upside down "V"'s). Where the template pattern 380 is inverted, the effective cycle-time of the zig-bursts 486 decreases at the ID as the angle of the zig-bursts 486 decreases by the head skew, while the effective cycle-time of the zag-bursts 488 increases at the ID as the angle of the zag-bursts 488 increases by the head skew. Thus, where the template pattern 380 is inverted, the pattern frequency is limited by the zag-bursts 488, rather than the zig-bursts 486 as described above. It is to be understood that embodiments of the invention described herein are equally applicable to different template patterns, for example where the zig-bursts 486 and zag-bursts 488 are inverted. Methods in accordance with the present invention should therefore be understood to apply to features limiting pattern frequency at the ID in a template pattern.

PES noise is typically much larger at the OD than at the ID, particularly where a servo frequency is maintained as the head 146 sweeps across the radius of the disk 120 (sometimes referred to as the stroke of the disk). The greater high-frequency content of the head signal at the OD (primarily due to the larger linear velocity of the media there) typically produces pulses with a lower fundamental signal level (that is, a smaller component of the signal at the fundamental harmonic frequency) and poorer signal quality. At the ID the pulses 484 and chevrons 486,488 have less high-frequency signal content and hence are "cleaner", which gives a larger fundamental signal amplitude, resulting in lower PES noise.

A method in accordance with one embodiment of the present invention comprises varying an amount of tilt incorporated into the zig-burst 486 portion of the template pattern 380 across the stroke such that zig-bursts 486 at the OD incorporate more tilt than zig-bursts 486 at the ID, which can incorporate zero chevron angle, for example. Nominally, the zig-bursts 486 incorporate chevron angle at the ID to maintain high gain (as described above). Eliminating the chevron angle component decreases the effective bit-length such that $$w_{eff} = \frac{\Delta}{\cos(\theta_s)}$$

Thus, varying the angle incorporated into the zig-bursts 486 between the ID and OD such that the zig-bursts 486 incorporate head skew, but do not incorporate chevron angle at the ID can permit an increase in the maximum allowable pattern frequency according to the equation:

$$\% \text{ increase} = \left[\frac{\cos(\theta_s)}{\cos(\theta_s + \theta_c)} - 1\right] * 100$$

For example, if the head skew at the ID ($\theta_s$) is 10 degrees and the chevron angle ($\theta_c$) is 20 degrees, varying the zig-bursts 486 can permit an increase in the maximum allowable pattern frequency of about 14%.

Eliminating the chevron angle for the zig-bursts 486 of the template pattern 380 shown in FIG. 4B at the ID can decrease the PES gain to approximately half of the nominal value at the ID (where the nominal value incorporates chevron angle). However, the PES noise is nominally lower at the ID than at the OD, and degradation can be acceptable. Because of the higher pattern frequency, PES noise degradation will be less than a factor of two at the ID, and the PES noise at the OD will be lower, resulting in a reduction in maximum PES noise of the template pattern 380. Reducing PES noise can reduce written-in runout when writing servo wedges. As described above, for template patterns where the chevrons are inverted, zag-bursts 488 at the ID incorporate head skew, but do not incorporate chevron angle, while zig bursts 486 incorporate both head skew and chevron angle.

Chevron angle can be incorporated into the zig-bursts 486 along the stroke, either gradually or abruptly. For example, where additional angle is continuously incorporated into the zig-bursts 486, the zig-bursts 486 can include the head skew at the ID across a portion of the stroke. The zig-bursts 486 can incorporate both the head skew and additional angle along the stroke as the circumference of the portion of the disk 120 passing under the head 146 increases. As the circumference increases, the physical size of the domain of magnetization of the pulses (the feature size) increases to maintain a constant pattern frequency. The zig-burst 486 can include a constant feature size with increasing zig-burst 486 angle such that the effective bit-length increases with increasing circumference to maintain a constant pattern frequency. If the zig-burst 486 feature size is the minimum feature size (i.e. not increasing) for a portion of the stroke, the maximum additional angle that can be incorporated into the zig-burst 486 without decreasing pattern frequency varies along the stroke according to the equation:

$$\theta_x = \cos^{-1}\left[\frac{R_{ID}}{R_x}\cos(\theta_s)\right] - \theta_s$$

where $\theta_x$ is the additional angle incorporated at a location x along the stroke, and $R_x$ is a radial distance from the center of the disk 120 at a location x along the stroke. For example, where the radius at the ID is 14 mm and the maximum head skew at the ID is 10 degrees, at a location along the stroke 15.75 mm from the center of the disk 120, the zig-bursts 486 can incorporate an additional angle of roughly 19 degrees for a total angle (head skew+additional angle) of roughly 29 degrees. In one embodiment, additional angle can be gradually added until the additional angle is equivalent to the desired chevron angle. Once the chevron angle has been fully incorporated into the zig-bursts 486, the angle of the zig-bursts 486 can continue to vary with the head skew along the stroke, rather than according to the equation given above.

In an alternative embodiment, the zig-bursts 486 can abruptly incorporate chevron angle without decreasing pattern frequency at a minimum distance along the stroke according to the equation:

$$R_x = R_{ID}\frac{\cos(\theta_s)}{\cos(\theta_{sx} + \theta_c)}$$

where $\theta_{sx}$ is the head skew at a distance x from the center of the disk 120. The head skew $\theta_{sx}$ is a function of the location along the stroke (i.e. the radius of the disk 120 at a distance x from the center of the disk 120, $R_x$), and an additional equation is required to solve for the unknowns, $\theta_{sx}$ and $R_x$. Roughly, in the example above with chevron angle of 20 degrees, maximum head skew of 10 degrees and ID radius of 14 mm, if $\theta_{sx}$ is about 8 degrees at 15.6 mm, the equation is satisfied. The chevron angle can be abruptly included in the zig-bursts 486 at least 15.6 mm from the center of the disk 120.

In some embodiments, the template pattern 380 can incorporate pulses 484 as "zero-angle" bursts to substitute for zig-bursts 486 in measuring radial position. The zero-angle bursts are not used near the OD, and optionally are not used at the ID where the zig-bursts 486 are equivalent to zero-angle bursts. The zero-angle bursts substitute for zig-bursts 486 in a region of transition where the zig-burst 486 angle is larger than the head skew, but not as large as the chevron angle with head skew. In the previous example, where additional angle is incorporated gradually, zero-angle bursts 484 can be substituted for the zig-bursts 486 when the head travels along the stroke from the ID (14 mm from the center of the disk 120) until at least 15.6 mm from the center of the disk 120.

To determine radial positioning along the entire stroke with an accuracy within a portion of a chevron cycle, a scheme is applied so that where zero-angle bursts 484 are substituted for zig-bursts 486, a particular formula or parameters for a formula is/are applied specific to the gross radial position of the head 146. The formula can be a simple proportional formula, for example, or multiple formulas and can be dependent on the chevron cycle count that the head 146 traverses. To precisely determine the chevron cycle count, the location of the head 146 can be determined relative to a marker-zone written to a portion of the printed media pattern.

Figure 5:
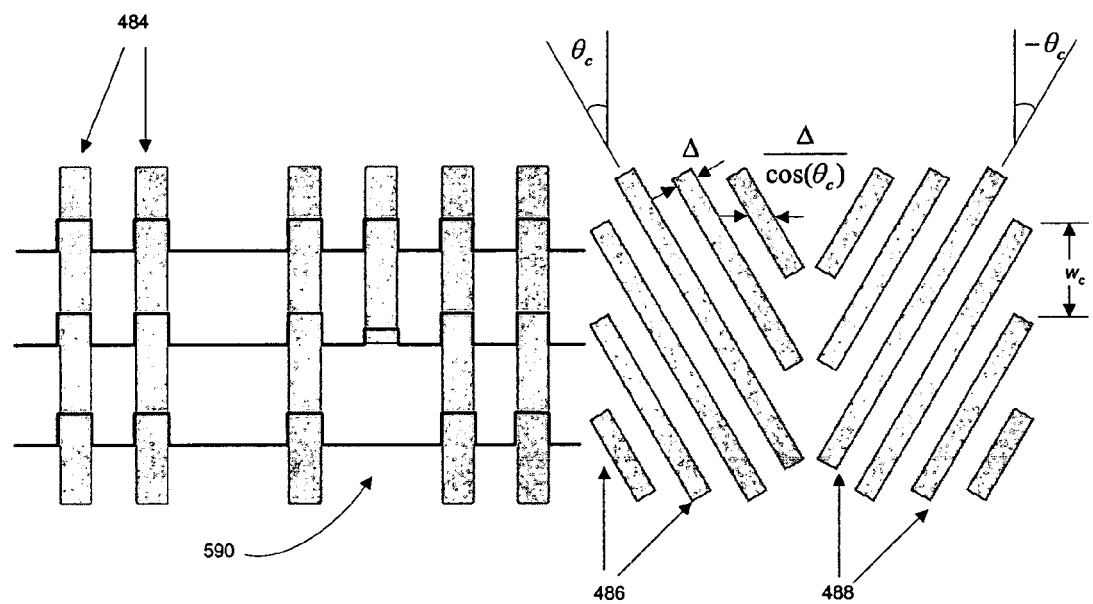
FIG. 5 illustrates the portion of FIG. 4A including a portion of a marker-zone in accordance with one embodiment of the present invention.

As shown in FIGS. 4A and 4B, the pulses 484 can be multiple, and as shown include six pulses. In one embodiment, one or more of the pulses 484 can be used as a marker-zone for gross positioning of the head 146. For example, as shown in FIG. 5, the fourth transition-pair (or "di-bit") from left to right is written so that the di-bit abruptly disappears at some radius from the center of the disk 120. At a radius closer to the center of the disk 120, the di-bit can abruptly reappear so that the pulse 484 is continued. The interruption in the radial continuity of the magnetized pulse 484 can be any length. For example, in one embodiment the interruption can be 200 μm, while in other embodiments the switch in magnetization can occur once such that a single marker-zone edge can be encountered by the head 146 as in travels radially along the stroke.

Signals detected by the head 146 at different radial positions along the stroke as the disk 120 passes beneath the head 146 overlay the pulses 484 as traces in FIG. 5. Where the head 146 traverses all six pulses 484, for example the top portion of the pulses 484 as illustrated, the digital detection circuitry detects a digital bit (the digital bit is a combination of an up and a down). Where the head 146 traverses five of the pulses 484, for example along the bottom portion of the pulses 484 as illustrated, the digital circuitry detects a missing digital bit. Where the head 146 straddles a marker-zone edge, moving radially from the pulse 484 to the marker-zone 590 the probability of detecting the digital bit slowly decreases. Where the head 146 equally straddles the transition in the digital pattern, the digital bit is half-sized.

Most commonly-used servo demodulation systems determine the digital content of a servo wedge signal by detecting either the presence or absence of filtered signal pulses at specified times or by detecting the value of the filtered signal at specified times. The filter can be a low-pass filter, a high-pass filter, or a combination of the two (i.e., a band-pass filter). The amplitude of the filtered signal can be calculated and compared to a threshold. The threshold can vary with an average amplitude of the filtered signal in the vicinity. The location along the stroke where the amplitude no longer exceeds the threshold can be used as a crude position signal indicating a marker-zone edge. A radial position of the head 146 can be known within a distance the size of the read width of the head 146 by detecting the marker-zone edge. The read width of the head 146 is much smaller than the width of the chevron cycle $w_c$. For example, in one embodiment the width of the chevron cycle is 3 μm. The width of the read head 146 is a small fraction of a micron. Therefore, the chevrons can provide fractional positioning of the head 146 relative to the gross positioning provided by the marker-zone edge.

A chevron cycle located at the same radial position as the marker-zone edge can have a designated cycle count so that the head 146 can determine radial positioning along the stroke by the cycle count of the chevron over which the head 146 passes. For example, where the designated cycle count is 1000, the head 146 can locate the marker-zone edge when the position of the head 146 is lost, and the radial position will be known to be chevron cycle count 1000 (plus a fractional cycle count based on whatever fractional position is measured from the actual chevron angle).

Use of this scheme can present a problem if the location of the marker-zone edge nearly coincides with an exact integer chevron cycle count. If one of the chevrons (either the zig-burst 486 or the zag-burst 488) has a phase of very nearly zero degrees at the edge of the marker-zone 590, then it can be difficult to decide whether to set the integer portion of the chevron cycle count to the designated cycle count or one count less than the designated cycle count. Using the example discussed above, the designated cycle count for the zig-burst 486 at the marker-zone 590 edge is 1000, while the corresponding designated cycle count for the zag-burst 488 is −1000. If the measured phase of the zig-burst 486 at the marker-zone 590 edge is very near zero degrees, for the servo wedge at which the chevron cycle counts are altered to account for the known location of the head 146, where the measured phase of the fractional cycle count is slightly more than zero degrees (i.e., a small positive phase) the integer portion of the zig-burst 486 cycle count can be set to 1000, while where the measured phase of the fractional cycle count is slightly less than 360 degrees (i.e., a small negative phase) the integer portion of the zig-burst 486 cycle count can be set to 999. Thus, a phase of a fractional cycle count near zero degrees (but slightly greater) will result in a total zig-burst 486 cycle count that is slightly greater than 1000, while a phase of a fractional cycle count near to 360 degrees (but slightly less) will result in a total zig-burst 486 cycle count that is slightly less than 1000. The same reasoning can be applied to determine the integer portion of the zag-burst 488 cycle count at the time that both the zig-burst 486 and zag-burst 488 cycle counts are altered to account for the known location of the head 146.

A method in accordance with one embodiment of the present invention can include determining fine position along a stroke by detecting a marker-zone edge and measuring the phase of the zig-bursts 486 and/or zag-bursts 488 succeeding the marker-zone edge. A set of criteria can be applied for determining chevron cycle count. For example, where the phase of the zig-bursts 486 is within the range of 0–269.9999 degrees, the chevron cycle count can be determined to be the designated cycle count and the fractional measurement (i.e., the phase as a fraction of 360 degrees), else the chevron cycle count can be determined to be the designated cycle count and the fractional measurement less one count. Thus, in the above example, where the phase is 240 degrees, the chevron cycle count is 1000.6667, and where the phase is 300 degrees, the chevron cycle count is 999.8333.

In another embodiment, a two-step analysis can be applied to determine fine position along the stroke by detecting a marker-zone edge and measuring the average phase of the zig-bursts 486 and/or zag-bursts 488 succeeding the marker-zone edge from one or more servo wedges and determining the proximity of the marker-zone edge to an exact integer chevron cycle count. For example, where the average phase of the zig-bursts 486 is less than 90 degrees or greater than 270 degrees, the true phase can be determined to be located in a "near wrap-around" zone, while where the average phase of the zig-bursts 486 is within a range of 90 to 270 degrees, the true phase can be determined to be in a "safe" zone. The second step of the analysis differs, depending upon whether or not the true phase is determined to be in the near wrap-around zone. For either case, the phase of a single burst (from a wedge that is designated to be the wedge at which the cycle count of both chevrons is adjusted) is measured. For the case of a burst having an average phase determined to be in a "near wrap-around" zone, if the phase is within the range of 0 up to 180 degrees, the chevron cycle count is determined to be the designated cycle count and the fractional measurement. If the phase is within the range of 180 up to 360 degrees, the chevron cycle count is determined to be the designated cycle count and the fractional measurement less one count. For the case of a burst who's average phase was determined to be in a "safe" zone, the chevron cycle count is always determined to be the designated cycle count at the designated wedge. For example, where the average phase of the zig-bursts 486 from one or more servo wedges is measured as 110 degrees and the phase of the burst at the designated wedge is 120 degrees, the chevron cycle count of the burst at that wedge is 1000.3333, while where the average phase of the zig-bursts 486 from one or more servo wedges is measured as 288 degrees, and the phase of zig-bursts 486 from the designated servo wedge is measured as 200 degrees, the chevron cycle count is 999.5555. Any number of different schemes having any number of analysis steps and criteria can be applied to determine the chevron cycle count at the marker-zone edge. One of ordinary skill in the art can appreciate the myriad different ways in which the chevron cycle count can be determined.

The marker-zone 590 can be positioned anywhere along the stroke. In one embodiment, the marker-zone 590 can be positioned centrally along the stroke, bisecting the stroke and minimizing the maximum distance from any location on the disk to the marker-zone 590, thereby improving nominal recovery time where the head 146 slips chevron cycles. In the above example, the marker-zone 590 define the radial position of chevron cycle 1000. A table of parameters, or a table of formulas for calculating radial position can be applied to account for the substitution of zero-angle bursts 484 for zig-bursts 486. If the zero-angle bursts 484 begin at chevron cycle count 7500 and continue until chevron cycle count 9000, a formula determining the fine radial positioning of the head 146 can rely on measurements of zag-bursts 488 only.

Alternatively, the marker-zone 590 can be positioned near the ID at a transition between the use of zero-angle bursts and zig-bursts. In the example given above, where the ID is 14 mm, zig-bursts 486 can be incorporated into the printed template pattern 380 at 15.75 mm from the center of the disk 120. In other embodiments, the marker-zone 590 can be sized such that an outer marker-zone edge identifies the radial position of a predefined chevron cycle count, and an inner marker-zone edge identifies a portion of the template pattern 380 having zero-angle bursts 484 in substitution of zig-bursts 486. In still other embodiments, multiple pulses 484 can include one or more marker-zones 590 such that at least one pulse 484 can define a chevron cycle count and at least one pulse can identify a portion of the template pattern 380 having zero-angle bursts 484 in substitution of zig-burst 486.

In an alternative embodiment of a method in accordance with the present invention, zig-bursts 486 can incorporate chevron angle at the ID, but not incorporate head skew angle. Varying the angle incorporated into the zig-bursts 486 between the ID and OD such that the zig-bursts 486 incorporate chevron angle, but do not incorporate head skew at the ID can permit an increase in the maximum allowable pattern frequency according to the equation:

$$\% \text{ increase} = \frac{\cos(\theta_s)}{\cos(\theta_s + \theta_c)} - 1$$

For example, if the head skew at the ID ($\theta_s$) is 10 degrees and the chevron angle ($\theta_c$) is 30 degrees, varying the zig-bursts 486 can permit an increase in the maximum allowable pattern frequency of 13%. For template patterns where the chevrons are inverted, the zag-burst 488 angle incorporates chevron angle while not incorporating head skew.

As described with regard to incorporating chevron angle along the stroke, head skew can be incorporated into the zig-bursts 486 along the stroke either gradually or abruptly, however with the expression $R_{ID} \cos(\theta_c)$ substituted for the numerator $R_{ID} \cos(\theta_s)$ in either equation given above. Further, as described above, the template pattern 380 can incorporate pulses 484 as "zero-angle" bursts to substitute for zig-bursts 486 in measuring radial position. One of ordinary skill in the art can appreciate the different strategies and methods for balancing and optimizing gain at the OD attributable to higher frequency with a reduction of gain at the ID attributable to reduced or eliminated zig-bursts 486.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method to determine a position of a head on a reference surface of a media including a plurality of pulses extending radially across said reference surface, at least one of the pulses having a gap such that the at least one of the pulses is radially discontinuous, comprising:
   measuring the plurality of pulses with the head;
   moving the head across said reference surface;
   detecting the gap; and
   determining said position based on detecting the gap.

2. The method of claim 1, wherein the gap is detected by an absence of the at least one of the pulses.

3. The method of claim 2, wherein the gap includes at least one edge defined by a radial transition from a presence of the at least one of the pulses to the absence of the at least one of the pulses.

4. The method of claim 3, wherein said position is further determined based on detecting the at least one edge.

5. The method of claim 4, wherein the at least one edge is detected when an amplitude of a signal measured by the head exceeds a threshold.

6. The method of claim 4, wherein said reference surface further includes a plurality of chevrons extending radially across said reference surface; and
   wherein when the at least one edge is detected, a phase of at least one of the chevrons measured at substantially the same radial location identifies a fractional portion of said position.

7. The method of claim 6, wherein said position can further be determined by counting a number of the at least one of the chevrons detected between the at least one edge and said position.

8. A method to determine a position of a head on a reference surface of a media including at least one servo wedge extending radially across at least a portion of said reference surface, said servo wedge including a plurality of pulses and a plurality of chevrons, at least one of the pulses having a gap such that the at least one of the pulses is radially discontinuous, the method comprising:
   detecting the plurality of pulses with the head;
   moving the head across said reference surface in a first direction;
   detecting the gap;
   moving the head across said reference surface in a second direction opposite the first direction;
   detecting at least one edge of the gap; and
   determining a gross position based on the at least one edge.

9. The method of claim 1, wherein the gap is detected by an absence of the at least one of the pulses.

10. The method of claim 8, wherein the at least one edge is defined by a radial transition from a presence of the at least one of the pulses to the absence of the at least one of the pulses.

11. The method of claim 8, wherein the at least one edge is detected when an amplitude of a signal measured by the head exceeds a threshold.

12. The method of claim 8, further comprising determining a phase of at least one of the chevrons measured at substantially the same radial location as the at least one edge;
determining a fine position based on the phase.

13. The method of claim 12, wherein said position can further be determined by counting a number of the at least one of the chevrons detected between the at least one edge and said position.

14. A method to determine a position of a head on a reference surface of a media including a template pattern printed on said reference surface, said template pattern having at least one servo wedge extending radially across a portion of said reference surface, said servo wedge including a plurality of pulses and a plurality of chevrons, at least one of the pulses having a gap such that the at least one of the pulses is radially discontinuous, the method comprising:
detecting the plurality of pulses with the head;
moving the head across said reference surface in a first direction;
detecting an absence of the at least one of the pulses;
moving the head across said reference surface in a second direction opposite the first direction;
detecting a radial transition from a presence of the at least one of the pulses to the absence of the at least one of the pulses; and
determining a gross position based on the radial transition;
measuring a phase of at least one of the chevrons measured at substantially the same radial location as the radial transition;
determining a fine position based on the phase.

15. The method of claim 14, wherein the radial transition is detected when an amplitude of a signal measured by the head exceeds a threshold.

16. The method of claim 14, wherein said position can further be determined by counting a number of the at least one of the chevrons detected between the at least one edge and said position.

17. A method to manufacture a reference surface for self-servo writing one or more surfaces of one or more rotatable media in a data storage device, comprising:
selecting a transfer medium having a template pattern, the template pattern including:
a marker-zone to determine a position of a head on the reference surface, the marker-zone including one or more edges defined by a radial transition from a presence of a transition-pair to an absence of the transition-pair;
wherein at least one of the one or more edges is located at a radial position; and
wherein the at least one of the one or more edges precedes one or more chevrons located at the radial position;
selecting a master disk having one or more surfaces;
transferring the template pattern to one of the one or more surfaces of the master disk.

18. The method of claim 17, wherein the transfer medium is a reticle.

19. The method of claim 17, wherein the transfer medium is a die.

20. The method of claim 17, wherein the transfer medium is a disk.

21. A method to manufacture a template pattern, comprising:
forming a marker-zone to determine a position of a head in a data storage device, the marker-zone including one or more edges defined by a radial transition from a presence of a transition-pair to an absence of the transition-pair;
wherein at least one of the one or more edges is located at a radial position; and
wherein the at least one of the one or more edges precedes one or more chevrons located at the radial position.

* * * * *